United States Patent [19]
Deters

[11] B 3,922,111
[45] Nov. 25, 1975

[54] CONTROL APPARATUS FOR A WATER SUPPLY SYSTEM

[75] Inventor: Elmer M. Deters, Muscatine, Iowa

[73] Assignee: Weil-McLain Company, Inc., Dallas, Tex.

[22] Filed: Oct. 11, 1973

[21] Appl. No.: 405,305

[44] Published under the Trial Voluntary Protest Program on January 28, 1975 as document no. B 405,305.

[52] U.S. Cl. ............ 417/26; 137/491; 417/38; 417/44
[51] Int. Cl.² ............ F04B 49/00; F04B 49/08
[58] Field of Search ............ 417/26, 38, 43, 44; 137/491

[56] References Cited
UNITED STATES PATENTS

| | | | |
|---|---|---|---|
| 2,839,077 | 6/1958 | Kristensson | 137/491 |
| 3,563,671 | 2/1971 | Weber | 417/38 |
| 3,782,858 | 1/1974 | Deters | 417/26 |

*Primary Examiner*—C. J. Husar
*Assistant Examiner*—Richard J. Sher

[57] ABSTRACT

A control apparatus for a water supply system having a motor operated pump for pumping water through a delivery line to one or more valved outlets. The control apparatus includes a pressure switch responsive to the pressure in the delivery line and operable at preselected upper and lower pressure limits to respectively stop and start the pump motor; a main flow control valve which regulates flow from the pump to the delivery line and having a pressure responsive operator; a pressure regulating pilot valve responsive to the pressure at the outlet of the main flow control valve for controlling the pressure on the pressure responsive operator of the main flow control valve to actuate the latter and maintain the pressure in the delivery line substantially constant at a value intermediate the upper and lower pressure limits during normal flow from the delivery line, a pneumatic pressure tank communicating with the outlet of the main flow control valve, and a bypass for passing a restricted flow to the pressure tank and delivery line when the main valve is closed to build up the pressure in the tank and delivery line to the upper pressure limit at which the pressure switch stops the pump motor.

7 Claims, 3 Drawing Figures

U.S. Patent  Nov. 25, 1975  3,922,111
*Fig. 1.*
*Fig. 2.*
*Fig. 3.*
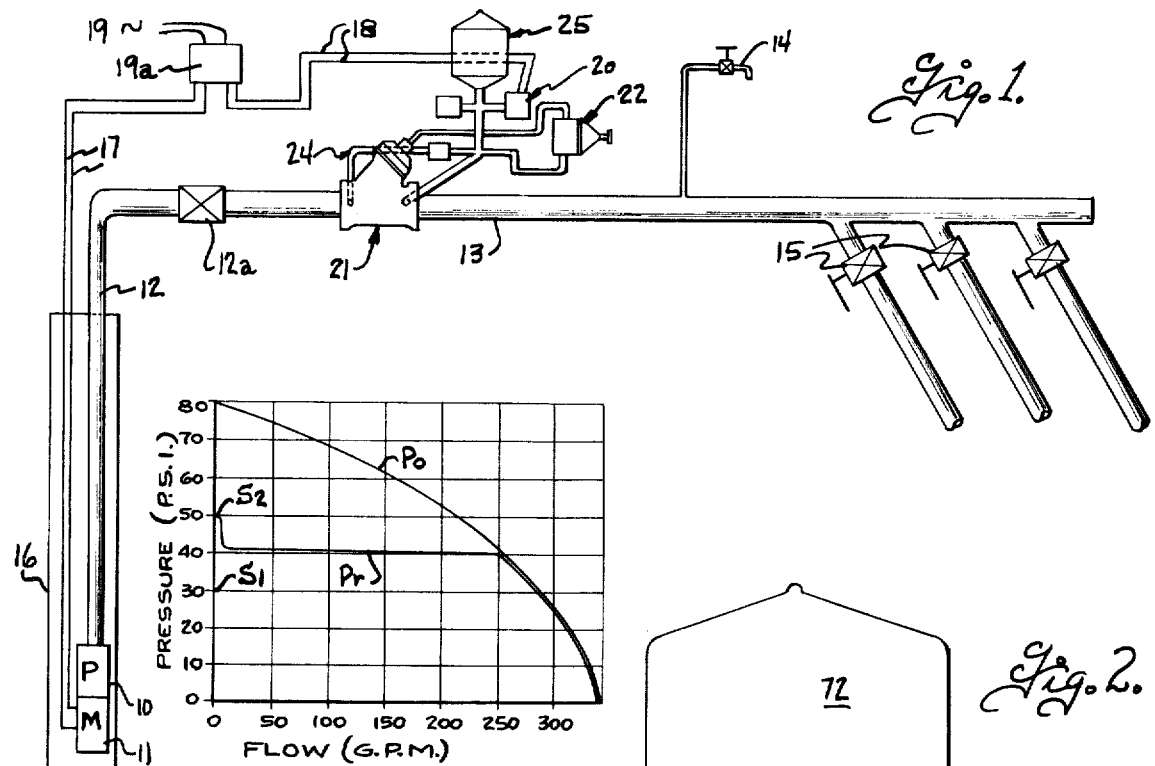
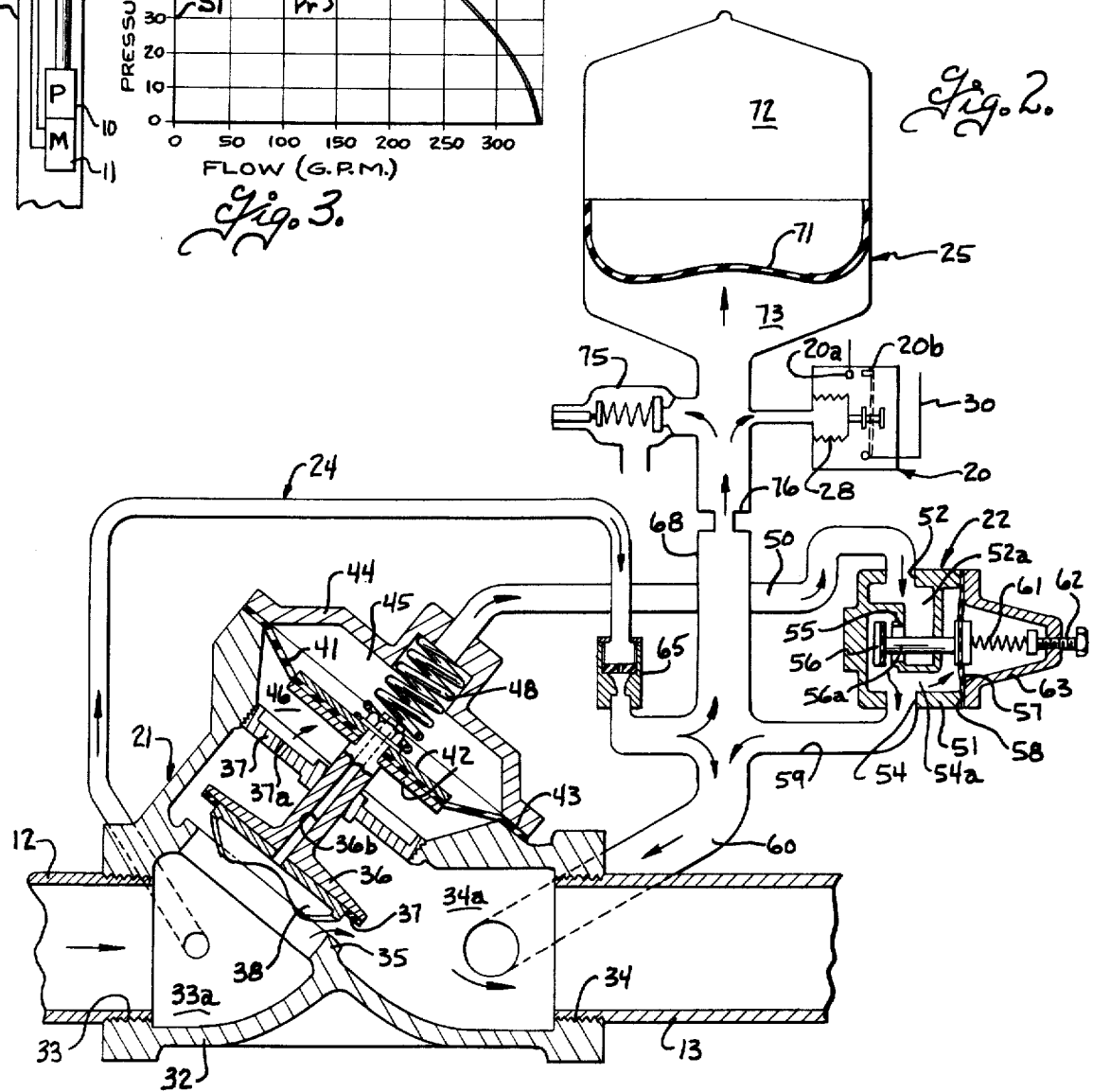

CONTROL APPARATUS FOR A WATER SUPPLY SYSTEM

BACKGROUND OF THE INVENTION

The present invention relates to a control apparatus for a water supply system of the type having a motor operated pump for pumping water through a delivery line to one or more valved outlets. In such water systems, a pressure switch is used to start the pump motor when the pressure in the delivery line drops to a preset lower pressure and to stop the pump when the pressure rises to a preset upper pressure. In order to prevent rapid cycling of the motor off and on when water is drawn from the delivery line, it is common practice to use a relatively large water storage tank to limit the rate at which the pump is cycled on and off when water is drawn from the line at a rate below the full pump discharge rate. In such conventional water supply systems, the pressure supplied to the delivery line varies from the upper switch operating pressure to the lower switch operating pressure and results in non-uniform rate of flow of water from apparatus supplied by the water system. Such large water storage tanks are bulky and require substantial space for each installation. Moreover, such tanks sometimes become water logged and cause rapid cycling of the pump motor.

In order to provide a more constant delivery line pressure and to minimize the size of the water storage tank required, it has heretofore been proposed as disclosed in the applicant's copending application Ser. No. 300,211, filed Oct. 24, 1972, now U.S. Pat. No. 3,782,858 to provide a control apparatus including a pressure switch responsive to the pressure in the delivery line for starting and stopping the pump at preselected upper and lower pressures respectively, and a pressure regulating valve in the delivery line ahead of the pressure switch and having a pressure responsive operator responsive to the pressure in the delivery line for controlling operation of the valve to regulate the pressure in the line at a value below the upper switch operating pressure during normal flow through the line, together with a bypass to pass a restricted flow into the delivery line, when the flow from the line is terminated, to cause the pressure in the line to build up above the regulated pressure and operate the pressure switch to shut off the pump.

In the applicant's prior flow control apparatus, the pressure regulating valve directly controlled the flow of water through the delivery line and the entire flow had to pass through the pressure regulating valve. While the prior flow control apparatus operated satisfactorily in water supply systems requiring relatively small flows, for example for flows up to around 20 gallons per minute, there is a need for a flow control apparatus to handle larger flows such as utilized in factories or on farms having sprinkling or irrigation systems. A conventional water supply system capable of handling very large flows, for example up to 250 gallons per minute, would require a very large storage tank and, moreover, the pressure variations inherent in the conventional water supply system as the storage tank fills and drains, is frequently undesirable.

It is the object of the present invention to provide a water system control apparatus for use in water systems which require very large flows, which avoids rapid cycling of the pump motor without requiring a large water storage tank, and which maintains a substantially constant pressure in the delivery line during normal flow from the line. Accordingly, the water system control apparatus of the present invention includes a pressure switch responsive to the pressure in the delivery line for starting the pump motor when the pressure reaches a preselected lower value and for stopping the pump motor when the pressure reaches a preselected upper pressure; a main valve member controlling flow from the pump to the delivery line and pressure switch and having a pressure responsive member for operating the main valve; a pressure regulating pilot valve which is responsive to the pressure at the outlet of the main valve and which controls the pressure on the pressure responsive operator of the main valve to open and close the main valve as required to maintain the pressure at the main valve outlet at a preselected regulated value intermediate the upper and lower switch operating pressures. During normal flow from the delivery line, the flow control valve prevents the pressure in the delivery line from rising to the upper switch operating pressure so that the pump operates continuously. A bypass is provided for bypassing a fluid from the main valve inlet to the main valve outlet to pass fluid into the delivery line when the flow from the delivery line is shut off and the main valve closes, to cause the pressure in the delivery line to build up to the upper switch operating pressure at which the pressure switch stops the pump motor. In order to inhibit rapid cycling of the pump motor off and on at flow rates below the bypass rate, a small pneumatic pressure tank is provided to communicate with the delivery line at the outlet side of the main flow control valve.

These, together with other objects and advantages of this invention will be apparent from the following detailed description and the accompanying drawings wherein:

FIG. 1 is a diagrammatic view of a water supply system installation embodying the control apparatus of the present invention;

FIG. 2 is a diagrammatic view of the control apparatus of the present invention on a larger scale than FIG. 1, and with portions shown in section to illustrate details of construction; and FIG. 3 is a graph illustrating the change in pump pressure and delivery line pressure with flow from the delivery line.

The control apparatus of the present invention is adapted for use in a water supply system of the type having a pump 10 which is driven by a motor 11 to deliver water through a pump discharge conduit 12 to a delivery line 13 leading to one or more valved outlets such as 14 and 15. The pump 10 is preferably of the non-positive displacement type, to avoid overloading of the pump motor when the flow from the pump is throttled and may, for example, be a centrifugal type pump or a jet type pump. As diagrammatically illustrated in FIG. 1, the pump 10 is disposed in a well 16 to pump water from the well through the pump discharge conduit 12 to the delivery line 13, it being understood that the pump could be arranged to receive water from a different water supply such as a tank or even another water pumping system, to boost the water pressure from the pressure at the water supply to a preselected substantially constant pressure in the delivery line. A check valve 12a is provided in the pump discharge conduit to maintain pressure in the delivery line when the pump is stopped.

The flow control apparatus is arranged so as to maintain the pressure in the delivery line substantially constant over a wide range of flows, for example from about 3 gallons per minute up to 250 gallons per minute. Thus, the control apparatus can be utilized in water systems in which water is sometimes drawn at relatively low flow rates, such as may occur from small outlets in an office or home, by the small valve 14 in FIG. 1, and sometimes at relatively high flow rates as would occur from one or more large valved outlets 15 for irrigation, commercial uses and the like.

As best shown in FIG. 2, the flow control apparatus includes a pressure switch 20 for controlling starting and stopping of the pump motor at preselected lower and upper pressures in the delivery line; a main flow control valve 21 for controlling flow from the pump outlet conduit 12 to the delivery line 13 and to the pressure switch; a pressure regulating pilot valve 22 which is responsive to the pressure at the outlet of the main flow control valve and which controls the application of pressure to the main flow control valve to open and close the same as required to maintain the pressure at the outlet substantially constant; a bypass 24 for passing a restricted flow of fluid from the main valve inlet to the main valve outlet when the main valve is closed to cause the pressure in the delivery line to increase above the regulated pressure to the upper switch operating pressure, and a pneumatic pressure tank 25 that communicates with the delivery line and which stores a small quantity of water sufficient to prevent rapid cycling of the pump motor at flow rates from the delivery line that are lower than the rate of flow through the bypass 24.

The pressure switch 20 is of the type commonly used in water systems and, as diagrammatically illustrated in FIG. 2, includes a pressure responsive actuator 28 which is operative at a preselected lower pressure, for example 30 p.s.i., to close the motor control contacts 20a and 20b and thereby start the pump motor, and which maintains the contacts closed to energize the pump motor until the pressure rises to a preselected upper pressure limit, for example 50 p.s.i., at which time the pressure switch opens the motor control contacts 20a, 20b and stops the pump motor. Such pressure switches which operate to start and stop the pump drive motor at selected upper and lower pressure limits are well known and further detailed illustration and description is deemed unnecessary. As diagrammatically shown in FIG. 1, the pump motor 11 and the pressure switch 20 are respectively connected through conductors 17 and 18 to a source of electrical power indicated by the lines 19 at a junction box 19a, it being understood that the pressure operated motor control switch 20 is connected either directly or through relays to the pump motor so as to start and stop the pump motor at the lower and upper pressure limits respectively.

The main flow control valve 21 includes a main valve casing 32 having an inlet 33 adapted for connection to the pump outlet conduit 12, and an outlet 34 adapted for connection to the delivery line 13. The main valve casing has a main valve seat 35 intermediate the inlet and outlet separating the casing into main inlet and outlet chambers 33a and 34a respectively, and a main valve member 36 is mounted, as in a guide 37 on the main valve casing for movement toward and away from the seat to control flow through the main valve member. A resilient gasket 36a is preferably provided to seal the interface between the main valve member 36 and the seat 35, when the main valve member is closed and the main valve member is constructed and arranged to progressively throttle the flow of water through the main valve seat as the main valve member approaches its closed position. For this purpose, the main valve member is formed with an axially projecting rim or flange 38 that extends axially from the valve member into the main valve seat and is preferably notched or undulated as shown at 38a in FIG. 2 to progressively restrict the flow of water as the main valve approaches its seated position.

The main valve member has a pressure responsive operator in the form of a diaphragm 41 that is attached to the stem of the main valve member 36 between clamp plates 42. The periphery of the diaphragm 41 overlies a flange 43 on the main valve casing and a cap 44 overlies the outer side of the diaphragm and clamps the periphery of the diaphragm to the flange to provide a seal therebetween and define a main pressure chamber 45 at the upper side of the diaphragm. The underside of the main valve diaphragm 41 is exposed to the fluid pressure at the main valve outlet 34. However, in order to inhibit excessively rapid movement of the main valve between its open and closed positions, the main valve guide 37 is arranged to form a substantially closed chamber 46 at the underside of the diaphragm, which chamber has restricted communication through passage 37a with the main valve outlet chamber 34a. The chamber 46 at the underside of the valve thus functions as a dash-pot to inhibit rapid movement of the diaphragm and the valve member in response to short duration pressure surges. A relatively light compression spring 48, capable of exerting a few pounds force, is interposed between the valve and cap 44 to yieldably bias the valve toward its closed position. Fluid under pressure from the pump is supplied to the main pressure chamber 45 through a flow control passage 36b advantageously formed in the stem of the valve member 36. Passage 36b extends completely through the valve stem and communicates the main pressure chamber 45 with the main valve inlet chamber 33a. As will be seen from the drawings, the main valve member 36 is movable from its closed position in the direction of flow through the main valve, that is in a direction away from the inlet chamber 33a, to its open position. The effective area of the diaphragm, that is the area inwardly of the flange 43 is made substantially larger than the crosssectional area of the valve seat 35 so that, when the valve member is closed, pressure from the inlet chamber applied through passage 36b to the pressure chamber 45 will exert a closing force on the diaphragm and valve member that is greater than the force exerted on the valve member by the pressure at the inlet chamber 33a.

The pressure regulating pilot valve member 22 is arranged to sense the pressure at the main valve outlet and controls the pressure in the main valve pressure chamber 45 in a manner to open and close the main valve as required to maintain a preselected substantially constant or regulated pressure at the main valve outlet, which regulated pressure is below the upper switch operating pressure and above the lower switch operating pressure. The pressure regulating pilot valve 22 includes a pilot valve casing 51 having a pilot valve inlet 52 connected, as through passage 50 with the pressure chamber 45. The pressure regulating pilot valve is arranged to respond to the pressure in the delivery line and has a pilot valve outlet 54 connected as through passages diagrammatically shown in 59 and 60 in FIG. 2 to the main valve outlet chamber 34a. The pilot valve has a valve seat 55 intermediate the pilot inlet and outlet and which separates the pilot valve casing into a pilot valve inlet chamber 52a and a pilot valve outlet chamber 54a. A pilot valve member 56 is mounted for movement toward and away from the valve seat to control flow through the pilot valve and the pilot valve has a pressure responsive operator in the form of a diaphragm 57 that overlies a flange 58 on the pilot valve casing and which is operatively connected to the stem 56a of the valve member 56. Means are provided for applying a preselected substantially constant force to the pilot valve member 56 to urge it toward its open position and, in the embodiment shown, the pressure regulator is of the spring type having a spring 61 interposed between the pilot valve member and an adjusting screw 62 carried by a cap 63 on the pilot valve casing. As is well understood, the adjusting screw is adjustable in the cap to vary the pressure applied by the spring 61 to the pilot valve member and the screw is adjusted so that the valve member will move to its closed position when the pressure at the outlet chamber side of the diaphragm 57 reaches a preselected value intermediate the upper and lower switch operating pressures. It will be understood, however, that other means may be utilized for biasing the regulating valve to its open position, for example a captive compressed air dome at the side of the diaphragm 57 opposite the pilot valve outlet chamber, which compressed air dome is precharged to a pressure equal to the desired pressure to be maintained by the pressure regulating pilot valve.

The bypass 24 is arranged to pass a restricted flow of water from the pump to the delivery line when the main valve is closed, to pressurize the delivery line until the pressure therein rises to the upper switch operating pressure to stop the pump motor. As shown, the bypass 24 is in the form of a conduit that communicates at one end with the main valve inlet chamber 33a and which communicates at its other end through passage 60 with the main valve outlet chamber and hence with the delivery line 13. For reasons pointed out hereinafter, a flow control valve 65 is advantageously provided in the bypass 24 to maintain a substantially constant rate of flow of water through the bypass when the main valve is closed, independent of the pump pressure. The flow control valve 65 can be of any suitable construction capable of maintaining a generally uniform rate of flow independent of the pressure drop thereacross and may, for example, be of the type disclosed in the U.S. Pat. to Leslie A. Kempton No. 2,454,929, dated Nov. 30, 1948.

The pneumatic pressure tank 25 also communicates as through passages 68 and 60 with the main valve outlet and hence with the delivery line 13. The pneumatic pressure tank 25 is of the type having a diaphragm 71 which separates the tank into air and water chambers 72 and 73. The main control valve 21, operated under the control of the pressure regulating pilot valve 22, prevents the pressure in the delivery line from rising to the upper switch operating pressure when water is drawn from the line at flow rates above the by-pass rate through bypass 24 so that the pump runs continuously at draws above the rate of flow through bypass 24. The displacement volume of the pressure tank is selected so as to prevent cycling of the pump motor on and off at flow rates from the delivery line below the rate of flow through bypass 24. The rate of flow of water through the bypass 24, when the main valve is closed, determines the minimum flow rate from the delivery line at which the control apparatus will maintain the desired substantially constant pressure. The flow controller 65 is accordingly selected to limit the rate of flow through the bypass to a relatively low rate, for example, below 3 gallons per minute, which is below normal draw from the system and which is yet sufficiently high so as to effect refilling of the pneumatic pressure tank 71 and pressurizing of the delivery line to the upper switch operating pressure in a reasonably short time interval, for example an interval of about 30 seconds or less. In order to achieve maximum draw from the tank, the tank is precharged to a pressure not substantially less than the regulated pressure to be maintained in the delivery line so that the diaphragm 71 will move to its lower position displacing the maximum volume of water from the tank at that pressure. In order to avoid spurious operation of the pressure switch due to pressure, a flow restrictor 76 is preferably provided in the passage 68 between the pressure tank and the delivery line, and the pressure switch 20 is arranged to communicate with the passage 68 at a location intermediate the restrictor 76 and the pressure tank 25. A pressure relief valve 75 is provided adjacent the tank, and preferably at a location intermediate the restrictor 76 and the tank, to prevent the application of excessive pressure to the tank which might cause rupturing of the same.

From the foregoing it is thought that the construction and operation of the flow control apparatus will be readily understood. For the purpose of describing the operation, it will be assumed that it is desired to maintain a preselected regulated pressure designated Pr in FIG. 3 over a wide range of flows, for example from about 3 gallons per minute to 250 gallons per minute. The pump 10 is selected so as to have an output characteristic capable of delivering water at a pump outlet pressure designated by the curve Po in FIG. 3 which is greater than the pump regulated pressure Pr over the desired flow range. The pressure switch 20 is set to close at a preselected upper limit designated S2 which is substantially above the regulated pressure Pr and may, for example, be 50 p.s.i., and to close at a preselected lower pressure designated Sl which is below the regulated pressure and which may, for example, be 30 p.s.i. The pneumatic pressure tank 25 is precharged to a pressure not substantially lower than the desired regulated pressure P r so that the diaphragm will move to its fully distended position to displace the maximum volume of water from the tank. The pressure regulating pilot valve 22 is of course adjusted by adjusting screw 62 so as to close the pilot valve when the pressure at the main valve outlet reaches the regulated pressure Pr.

For the purpose of describing the operation, it will be assumed that the pressure in the delivery line has built up to the upper switch operating pressure S2 of 50 p.s.i. and that the pump is stopped. If one of the outlet valves such as 14 or 15 is opened to draw water from the delivery line, a quantity of water will initially flow from the tank 25 into the delivery line. However, this volume is relatively small and, as previously described, is made just sufficient to prevent rapid cycling of the pump motor in the event of very low draws or small leakage from the line. As soon as the diaphragm 71 in the tank reaches its fully distended position, the pressure in the delivery line will rapidly drop until it reaches a lower switch operating pressure S*l* (30 p.s.i.) to start the pump motor. The pressure in the delivery line will then build up to the operating pressure range of about 40 p.s.i. and the pressure responsive operator 57 of the pilot regulating valve will then move the valve member toward its closed position throttling flow from the main pressure chamber 45 so that the pressure builds up in the main pressure chamber and operates on the diaphragm 41 to urge the main valve 26 toward its closed position. The pilot valve will continue to respond to the pressure at the outlet of the main valve and to regulate the pressure applied to the diaphragm 41 of the main valve in a manner to move the main valve toward and away from its seat to variably throttle the flow of water to the main valve outlet and maintain the desired pressure P*r* at the main valve outlet. Only a very small volume of water must flow through the pilot valve to regulate the pressure on the main valve and the pilot valve will accordingly accurately control the pressure at the outlet of the main valve as flow through the delivery line has increased and decreased throughout the operating range of the pump.

Thus, during normal flow from the delivery line, the pressure regulating pilot valve operates the main valve to prevent the pressure in the delivery line from building up to the upper switch operating pressure S2 so that the pump operates continuously during normal draw. However, when flow from the delivery line is throttled to a rate below the rate of flow through the bypass 24 and flow control valve 65, the flow through the bypass causes the pressure in the delivery line and tank 25 to build up to the upper switch operating pressure S2 to stop the pump motor.

The embodiments of the invention in which an exclusive property or privilege is claimed are defined as follows:

1. A control apparatus for use in a water supply system of the type having a motor operated pump operable to pump water through a delivery line to one or more valved outlets, said control apparatus being adapted to control starting and stopping of the pump motor and to regulate pressure in the delivery line to a substantially constant delivery pressure during normal flow through the delivery line and comprising:
   a. a main valve casing having a main valve inlet and a main valve outlet adapted for connection in the water system to have water from the pump flow therethrough to the delivery line, said main valve casing having a main valve seat intermediate said main valve inlet and said main valve outlet, a main valve member for controlling flow through said main valve seat, a main pressure responsive movable wall operatively connected to said main valve member and having one side exposed to pressure at said main valve outlet, means defining a main pressure chamber at the other side of said main pressure responsive movable wall for applying pressure thereto in opposition to the pressure at said one side of the main pressure responsive movable wall, control passage means communicating said main valve inlet with said main pressure chamber for passing a restricted flow of water to the main pressure chamber to pressurize the main pressure responsive movable wall in a direction to close the main valve member,
   b. a pressure operated motor control switch responsive to the pressure at said main valve outlet for energizing the pump motor when the pressure at the main valve outlet reaches a preset lower switch operating pressure and for deenergizing the pump motor when the pressure at the main valve outlet reaches a preset upper switch operating pressure to thereby control starting and stopping of the pump,
   c. a pressure regulating pilot valve including a pilot valve casing having a pilot valve inlet communicating with said main pressure chamber and pilot valve outlet communicating with said main valve outlet and a pilot valve seat intermediate said pilot inlet and pilot outlet, a pilot valve member for controlling flow through said pilot valve seat, pilot valve biasing means for applying a preselected substantially constant force to said pilot valve member urging the same toward an open position, a pilot pressure responsive movable wall responsive to the pressure at said main valve outlet and operatively connected to said pilot valve member for moving the pilot valve member against the force of said pilot valve biasing means to a closed position as the pressure at the main valve outlet increases to a preselected delivery pressure intermediate said upper and lower switch operating pressures, said pilot valve controlling flow from said main pressure chamber and being operative to vary the pressure therein and effect movement of the main valve member toward and away from its seat to maintain the pressure at the main valve outlet substantially constant at said preselected delivery pressure over a wide range of flow through the main valve,
   d. a pneumatic pressure tank communicating with said main valve outlet; and
   e. a bypass communicating said main valve inlet with said main valve outlet and said pneumatic pressure tank for passing a restricted flow thereto when the main valve is closed to refill the pneumatic pressure tank until the pressure increases at the main valve outlet to said upper switch operating pressure and said motor control switch deenergizes the pump motor.

2. A control apparatus according to claim 1 wherein said main valve member has means extending into said main valve seat for progressively throttling flow through the main valve as the main valve member moves toward its seated position.

3. A control apparatus according to claim 1 wherein said bypass has a pressure responsive flow control valve therein for maintaining a generally uniform rate of flow therethrough with varying pressure at the main valve inlet.

4. A control apparatus according to claim 1 wherein said pneumatic pressure tank has a diaphragm separating the tank into air and water compartments, and said air compartment is precharged to a pneumatic pressure not substantially less than said lower switch operating pressure.

5. A control apparatus according to claim 1 wherein said tank and pressure switch communicate with said main valve outlet through a common passage, and a flow restrictor in said common passage for inhibiting application of pressure surges in the delivery line to said pressure switch.

6. A control apparatus according to claim 1 wherein said main valve member is arranged to open in the direction of flow from the main valve inlet to the main valve outlet.

7. In a water supply system including a delivery line having one or more valved outlets and a motor operated pump connected to the delivery line and operable to pump water therethrough, a control apparatus comprising:

a. a pressure operated motor control switch responsive to the pressure in the delivery line and operatively connected to the pump motor for starting the pump motor when the pressure at the main valve outlet reaches a preset lower pressure and for stopping the pump motor when the pressure in the delivery line reaches a preset upper switch operating pressure, b. a main control valve connected in the delivery line ahead of the pressure switch to regulate the pressure in the delivery line during normal draws therefrom to a substantially constant pressure below the upper switch operating pressure, said main control valve including a main valve casing having a main valve inlet connected to receive water from the pump and a main valve outlet connected to the delivery line and a main valve seat intermediate said inlet and outlet, a main valve member controlling flow through the main valve seat, a main pressure chamber, a main pressure responsive member operatively connected to said main valve member and having one side exposed to pressure in said main pressure chamber and the other side exposed to pressure in said main outlet chamber, control passage means communicating said main valve inlet with said main pressure chamber for passing a restricted flow of water to the main pressure chamber to pressurize the main pressure responsive member in a direction to close the main valve member, c. a pressure regulating pilot valve controlling flow from the main pressure chamber including a pilot valve casing having a pilot valve inlet communicating with said main pressure chamber and a pilot valve outlet communicating with said delivery line at the outlet side of the main valve and a pilot valve seat intermediate said pilot inlet and said pilot outlet, a pilot valve member controlling flow through said pilot valve seat, pilot valve biasing means for applying a preselected substantially constant force urging the same toward an open position, a pilot pressure responsive member responsive to the pressure in said delivery line at the outlet of the main valve and operatively connected to said pilot valve member for moving the pilot valve member against the force of said pilot valve biasing means to a closed position as the pressure in the delivery line increases to a preselected delivery pressure intermediate said upper and lower switch operating pressures, said pilot valve controlling flow from said main pressure chamber and being operative to vary the pressure therein and effect movement of the main valve member toward and away from its seat to maintain the pressure at the main valve outlet substantially constant at said preselected delivery pressure over a wide range of flow from the delivery line, d. a pneumatic pressure tank communicating with said delivery line, and e. a bypass for passing a restricted flow of water from the main valve inlet to the main valve outlet and to said pneumatic pressure tank to pressurize the tank and delivery line when the main valve is closed until the pressure in the delivery line increases to said upper switch operating pressure and said motor control switch stops the pump motor.

* * * * *